United States Patent Office 3,702,322
Patented Nov. 7, 1972

3,702,322
DERIVATIVES OF LINCOMYCIN AND ITS ANALOGS AND PROCESS
Brian Bannister, Kalamazoo, Mich., assignor to The Upjohn Company, Kalamazoo, Mich.
No Drawing. Filed Apr. 6, 1970, Ser. No. 26,119
Int. Cl. C07c 47/18
U.S. Cl. 260—210 R                    28 Claims

ABSTRACT OF THE DISCLOSURE

Alkyl 7-deoxy-7(S)-OR-α-thiolincosaminides useful as intermediates for preparing antibacterially active 7-deoxy-7(S)-OR-lincomycins are prepared by opening the aziridine ring of alkyl N-acyl-6,7-aziridino-6-deamino-7-deoxy-α-thiolincosaminides by hydrolysis or alcoholysis.

BRIEF DESCRIPTION OF THE INVENTION

The invention relates to alkyl 7-deoxy-7(S)-OR-α-thiolincosaminides of Formula I and acylates thereof and to a process for making the same

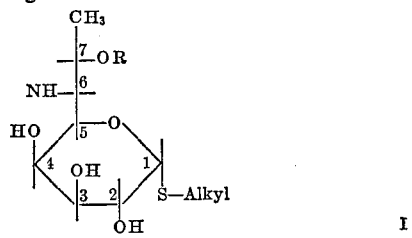

I

Alkyl is alkyl of not more than 4 carbon atoms, for example, methyl, ethyl, propyl, isopropyl, butyl, sec.-butyl, isobutyl, and tert.-butyl and R is hydrogen or a hydrocarbon radical, advantageously containing not more than 12 carbon atoms, and hydrocarbon radicals substituted by one or more hydroxy, alkoxy, or halogen groups, advantageously containing not more than 12 carbon atoms. Suitable hydrocarbon and hydroxy, alkoxy, and halo-substituted hydrocarbon radicals include alkyl, aralkyl, cycloalkyl, aryl, and hydroxy, alkoxy, and halo-substituted alkyl, aralkyl, cycloalkyl, and aryl. Suitable such radicals include methyl, ethyl, propyl, butyl, pentyl, hexyl, heptyl, octyl, nonyl, decyl, undecyl, and duodecyl, and the isomeric forms thereof; hydroxyethyl, glyceryl, alkoxyethyl where the alkoxy group contains advantageously not more than 10 carbon atoms; 2-chloroethyl, 2-bromoethyl, 2-iodoethyl, benzyl, o-, m-, and p-hydroxybenzyl, o-, m-, and p-halobenzyl where halo is chlorine, bromine, iodine; o-, m-, and p-alkoxybenzyl and o-, m-, and p-alkoxyphenethyl where alkoxy is as given above; phenethyl, o-, m-, and p-hydroxyphenethyl, o-, m-, and p-halophenethyl where halo is chlorine, bromine, or iodine; cyclohexyl, cyclopentyl, 3-cyclopentylpropyl, phenyl, o-, m-, and p-hydroxyphenyl, o-, m-, and p-halophenyl where halo is chlorine, bromine, or iodine, o-, m-, and p-alkoxyphenyl where alkoxy is as given above, α- and β-naphthyl, α- and β-naphthylmethyl, α- and β-naphthylethyl.

The compounds of Formula I can be obtained in several different ways. All of the processes involve the opening of the aziridine ring of a methyl or ethyl 6,7-aziridino-6-deamino-7-deoxy-α-thiolincosaminide of the formula

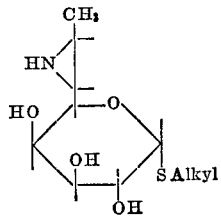

II by acid catalyzed hydrolysis or acid catalyzed alcoholysis in the presence of acetic anhydride or like carboxylic acid anhydride coupled with gentle heating. N-acylation by the anhydride supplies the acid catalyst. The opening of the aziridine ring yields an acylated alkyl 7-deoxy-7(S)-or-α-thiolincosaminide of the following formula

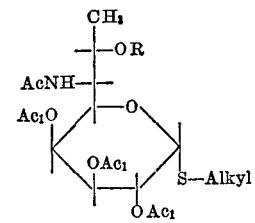

III in which Ac is a carboxacyl and $Ac_1$ is hydrogen. The carboxacyl group is then removed by hydrazinolysis in a manner already well known in the art (See U.S. 3,179,-565) to yield alkyl 7(S)-O-alkyl-7-deoxy-α-thiolincosaminide of Formula I.

The compounds of the invention (Formula I) are useful for the same purposes as methyl α-thiolincosaminide (methyl 6-amino-6,8-dideoxy-1-thio - D - erythro - α - D-galacto-octopyranoside, α-MTL) as disclosed in U.S. Pat. 3,380,992 and moreover can be acylated with trans-1-methyl-4-propyl-L-2-pyrrolidine carboxylic acid and like acids to form 7-deoxy-7(S)-OR-derivatives of lincomycin and analogs thereof which are useful as antibacterial agents.

In accordance with a preferred embodiment of the invention the starting compound of Formula II is first allowed to react with acetic anhydride or like carboxacyl anhydride in methanol to give alkyl N-acyl-7-deoxy-7(S)-methoxy-α-thiolincosaminide (methyl 7-O-methyl-6-acyl-amino-6,8-dideoxy-1-thio-L-threo - α - D - galacto - octopyranoside). The reaction proceeds smoothly at room temperature though higher temperatures say up to about 30° C. can be used. Any lower temperature which does not slow the reaction down too much can be used.

The N-acyl group can then be removed by hydrazinolysis in a manner already well known in the art.

It is sometimes advantageous, however, to fully acetylate the product of the methanolysis, that is the alkyl N-acetyl-7-deoxy-7(S)-methoxy - α - thiolincosaminide, in order to provide a product which is more easily purified. When the methanolysis product, of Formula III where $Ac_1$ is hydrogen, is acylated with acetic anhydride, or like carboxacyl anhydride, in pyridine in a manner already well known in the art, the product under these conditions has been shown to be a mixture containing mainly the product of Formula III where both Ac and $Ac_1$ are acyl groups and a minor amount of a triacylate in which the 4-$Ac_1$ is hydrogen.

The reaction mixture can be purified by simple crystallization or simple chromatography and then converted to the desired product (Formula I) by hydrazinolysis or it can be resolved into its components by separation techniques already well known in the art such as liquid-liquid countercurrent extraction, for example Craig countercurrent distribution or partition chromatography.

By substitution of the methanol by other hydroxy compounds of the formula ROH wherein R is as given above the corresponding 7-OR derivatives are obtained.

By substituting the methanol by water there are obtained compounds of Formula III wherein $Ac_1$ and R are hydrogen which on hydrazinolysis yield alkyl 7-epi-α-thiolincosaminides of Formula I where R is hydrogen which on acylation with the appropriate L-2-pyrrolidine-carboxylic acid yield 7-epilincomycin and analogs thereof as disclosed in U.S. Pat. 3,380,992.

When the starting compound is N-acylated, it is not necessary, if time permits, to use acid catalyzed hydrolysis or acid catalyzed alcoholysis. A mild acid condition greatly accelerates the solvolysis, though. Thus it is of advantage to effect the solvolysis under mildly acidic conditions such as are obtained with acetic acid or like carboxylic acids.

In accordance with another preferred embodiment of the invention, the aziridine starting compound of Formula II is acylated with acetic anhydride or like carboxacyl anhydrides in an alkyl carbinol, for example, ethanol, propanol, and butanol. The reaction takes place readily at room temperature. Higher or lower temperatures can be used but temperatures high enough to cause peracylation should be avoided. Generally speaking temperatures above 30° C. should be avoided. The result is acylation at the nitrogen only to give a product of the following formula

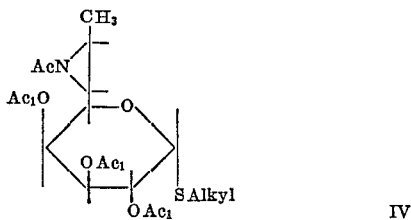

wherein $Ac_1$ is hydrogen. On subjecting the resulting compound to hydrolysis or alcoholysis in the presence of acetic acid, or like carboxylic acid, with gentle heating, for example, at the reflux temperature, there is obtained a compound of Formula III wherein Ac is acyl, $Ac_1$ is hydrogen, and R is hydrogen or the radical of the alcohol used in the alcoholysis. The resulting product can be processed in ways already described to give the desired compound (Formula I).

When the alcohol in the latter embodiment is ethanol—i.e., where ethanol is the alkyl carbinol—both acylation and alcoholysis result concomitantly so that half of the product is N-acyl-aziridine of Formula IV where $Ac_1$ is hydrogen and the other half is the desired ring-opened product of Formula III where $Ac_1$ is hydrogen. With other alkyl carbinols little or no ring opening results.

In accordance with another preferred embodiment of the invention the starting aziridine compound of Formula II is peracylated using acetic anhydride or like carboxacyl anhydride in pyridine or other acid binding agent, to give a compound of Formula IV in which both Ac and $Ac_1$ are carboxacyl groups. The resulting product is then subjected to alcoholysis in acetic acid with heating in a manner already described to give compound of Formula III in which Ac and $Ac_1$ are both carboxacyl. This process has the advantage that the resulting product is easily purified by such techniques as crystallization and absorption or partition chromatography and is readily converted to the desired compound of Formula I by hydrazinolysis in a manner already described.

The starting aziridino compounds of Formula II can be obtained by dehydrohalogenation of methyl 7(S)-chloro-7-deoxy-α-thiolincosaminide (Belgian Pat. 705,427, Apr. 22, 1968; U.S. application 692,727, filed Dec. 22, 1967). The dehydrohalogenation is effected with anhydrous sodium carbonate by heating at reflux in dimethylformamide (Belgian Pat. 732,352, October 1969; U.S. application 725,531, filed Apr. 30, 1968).

By acylating the compounds of the invention (Formula I) with an L-2-pyrrolidinecarboxylic acid, compounds of Formula III in which Ac is the acyl of the L-2-pyrrolidinecarboxylic acid and $Ac_1$ is hydrogen are obtained. When alkyl and R are methyl and the L-2-pyrrolidinecarboxylic acid is trans-1-methyl-4-propyl-L-2-pyrrolidinecarboxylic acid, the compound is 7(S)-methoxy-7-deoxylincomycin which has antibacterial activity in the order of six or seven times greater than the antibacterial activity of the corresponding unalkylated compound, i.e., 7-epilincomycin. It can be utilized for the same purposes as lincomycin bearing in mind that it is several times more active than lincomycin.

The compounds of the invention (Formula I) as well as the acylates thereof with an L-2-pyrrolidinecarboxylic acid can exist in either the free base form or in the form of an acid addition salt. These acid addition salts can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicyclic, 3-methylglutaric, orthosulfobenzoic, cyclohexanesulfamic, cyclopentanepropionic, 1,2 - cyclohexanedicarboxylic, 4 - cyclohexenecarboxylic, octadecenylsuccinic, octenylsuccinic, methanesulfonic, benzenesulfonic, helianthic, Reinecke's, dimethyldithiocarbamic, hexadecylsulfamic, octadecylsulfamic, sorbic, monochloroacetic, undecylenic, 4' - hydroxyazobenzene-4-sulfonic, octeyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

The free bases can be used as buffers or as antacids. They react with isocyanates to form urethanes and can be used to modify polyurethane resins. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The invention can be more fully understood by reference to the following examples in which the solvent ratios are volume to volume and the parts are by weight unless otherwise specified.

EXAMPLE 1.—7-Deoxy-7(S)-methoxylincomycin hydrochloride

Part A–1: Methyl N-acetyl-7-deoxy-7(S)-methoxy-α-thiolincosaminide

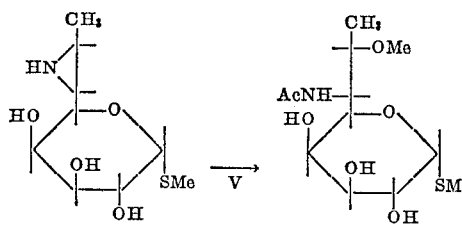

A suspension of 2.35 gms. of methyl 6,7-aziridino-6-deamino - 7 - deoxy-α-thiolincosaminide (V) was maintained with stirring in 25 ccs. of methanol. To the suspension was then added 2.04 gms. of acetic anhydride. After stirring at room temperature for one hour the solvent was removed on a rotary evaporator at 40° C./7 mm. The resulting solids were then chromatographed on a 4.8 x 94 cm. column of silica gel using 1 MeOH:10 CHCl₃ as the solvent system. The weight of the silica was 750 gms. After a forerun of 1000 ml., 50 ml. fractions were collected. Fractions 31–85 were combined, and evaporated to dryness yielding 3.2 gms. of methyl N-acetyl-7(S)-methoxy-7-deoxy-α-thiolincosaminide (VI) as a colorless amorphous solid, having the molecular weight by mass spectrometry of 309, compared with the calculated molecular weight of 309.38.

Part B–1: Methyl 7-deoxy-7(S)-methoxy-α-thiolinosaminide (VII) (Methyl 6,8 - dideoxy-7-O-methyl-6-amino-1-thio-L-threo-α-D-galacto-octopyranoside)

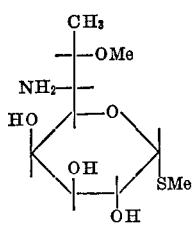

VII

A solution of 3.2 gms. of methyl 7-deoxy-7(S)-methoxy-α-thiolincosaminide (VI) in 25 gms. of hydrazine hydrate was heated under gentle reflux with stirring in an oil-bath at 145° C. overnight. The solvent was removed from the colorless solution as completely as possible by distillation from an oil-bath at 100° C./15 mm. and finally at high vacuum to give methyl 7-deoxy-7-(S)-methoxy-α-thiolincosaminide as a colorless syrup. The syrup was chromatographed on 750 gms. of silica gel in a 4.8 x 97 cm. column using 1 MeOH:10 CHCl₃ as the solvent system. After 1.4 liter forerun, 50 ml. fractions were collected. Fractions 281–600 were pooled and evaporated to dryness yielding 2.06 gms. methyl 7-deoxy-7(S)-methoxy-α-thiolinocosaminide (VI) which on crystallization from acetonitrile yielded colorless needles having the following characteristics: M.P. 154–155° C. $[\alpha]_D+260°$ (c., 0.5634, H₂O).

Analysis.—Calcd. for $C_{10}H_{21}O_5NS$ (percent): C, 44.92; H, 7.92; N, 5.24; S, 12.00; OMe, 11.61. Found (percent): C, 45.20; H, 7.96; N, 5.08; S, 12.19; OMe, 11.86. Mol. wt. calcd.: 267.35. Found (mass spec.): 2.67.

Part C–1: 7-Deoxy-7(S)-methoxylincomycin hydrochloride

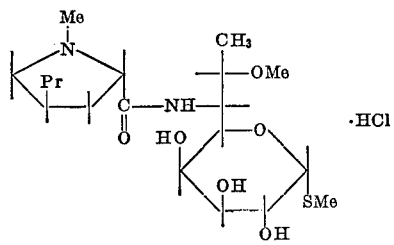

VIII

To a suspension of 2.7 gms. of trans-1-methyl-4-propyl-L-2-pyrrolidinecarboxylic acid hydrochloride in 90 ccs. of acetonitrile was added with stirring 2.89 gms. of triethylamine. The stirring was continued until all of the solid had dissolved; the reaction mixture was then cooled in an ice/methanol bath to —5° C., when a precipitate of triethylamine hydrochloride appeared. There was then added 1.78 gms. of isobutyl chloroformate dropwise keeping the temperature of the reaction at —5° to —3° C. Additional triethylamine hydrochloride precipitated and stirring was continued at —5° C. for 20 minutes. To the resulting reaction mixture was added 1.74 gms. of methyl 7-deoxy-7(S)-methoxy - α - thiolincosaminide (VII), dissolved in 10 ccs. of water. As the solids dissolved, the temperature rose to about 0° C. and stirring was continued for 2 hours, without further icing the cooling bath. The solvent was then removed on a rotary evaporator at 40° C./15 mm. to a brown viscous residue. This was dissolved in dilute hydrochloric acid and the solution (pH 2) extracted twice with chloroform and the combined extracts washed once with water. The aqueous phase containing the wash water was adjusted to pH 11 with sodium hydroxide (50% aqueous solution), saturated with sodium chloride and extracted 3 times with chloroform. The combined chloroform extracts were dried over anhydrous sodium sulfate and taken to dryness yielding 1.76 gms. of a tan amorphous solid. The tan amorphous solid was chromatographed on 750 gms. of silica gel in a 4.8 x 94 cm. column using 1 MeOH:15 CHCl₃ as the solvent system. After 1.3 liters of forerun, 50 ml. fractions were collected. Fractions 60 through 80 were pooled and taken to dryness yielding 7-deoxy-7(S)-methoxylincomycin free base as an almost colorless syrup. This free base was taken up in dilute aqueous HCl and the resulting solution filtered and freeze-dried yielding 801.4 mg. of 7-deoxy-7(S)-methoxylincomycin hydrochloride as a colorless amorphous solid having the following characteristics: $[\alpha]_D+117°$ (c., 0.9626, H₂O).

Analysis.—Calcd. for $C_{19}H_{36}O_6N_2S \cdot HCl$ (percent): C, 49.93; H, 8.16; N, 6.13; S, 7.02. Found (corrected for 5.14% H₂O) (percent): C, 49.44; H, 7.99; N, 6.20; S, 6.48.

Mol. wt. Calcd. for anhydrous free base: 420.57
Found (Mass spec.): 420
Antibacterial activity: 2 to 4 times lincomycin hydrochloride
Antibacterial spectrum: Same as lincomycin
Antibacterial activity against mice infected with Staphylococcus aureus:
$CD_{50}=7.0$ (4.4–11.1) mg./kg.=½ to 1 times the activity of 7(S)-chloro-7-deoxylincomycin hydrochloride.

EXAMPLE 2.—ALTERNATIVE METHOD FOR PRODUCING METHYL 7-DEOXY-7(S)-METHOXY-α-THIOLINCOSAMINIDE (VII)

Part A–2: Methyl N-acetyl-6,7-aziridino-6-deamino-7-deoxy 2,3,4-tri-O-acetyl-α-thiolincosaminide (IX)

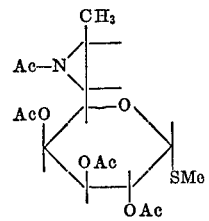

IX

To a solution of 2.0 gms. of methyl 6,7-aziridino-6-deamino-7-deoxy-α-thiolincosaminide (V) in 20 ccs. of pyridine was added with stirring 10 ccs. of acetic anhydride and the reaction mixture left overnight at room temperature. The volatile material was removed as completely as possible from the reaction mixture on a rotary evaporator at 40° C./7 mm., finally at high vacuum, to a colorless solid. The resulting solid was dissolved in chloroform, stirred with aqueous cadmium chloride to remove the pyridine, filtered and the chloroform layer washed twice with water, and dried over anhydrous sodium sulfate. On removal of the solvent on the rotary evaporator at 40° C./7 mm. methyl N-acetyl-6,7-aziridino-6-deamino-7-deoxy-2,3,4-tri-O-acetyl - α - thiolincosaminide (IX) was obtained as a colorless crystalline solid, weight 3.1 gms. Recrystallization from ethyl acetate-Skellysolve B (technical hexane) gave colorless prismatic needles having the following characteristics: M.P. 173.5–175° C. $[\alpha]_D+222°$ (c., 0.912, CHCl₃).

Analysis.—Calcd. for $C_{17}H_{25}O_8NS$ (percent): C, 50.61; H, 6.25; N, 3.47; S, 7.95. Found (percent): C, 50.43; H, 6.33; N, 3.41; S, 8.31. Mol. wt. calcd.: 403.45. Found (Mass spec.): 403.

Part B-2: Methyl N-acetyl-2,3,4-tri-O-acetyl-7-deoxy-7(S)-methoxy-α-thiolincosaminide (X)

A mixture of 5 gms. of methyl N-acetyl-2,3,4-O-triacetyl-6,7-aziridino-6-deamino - 7 - deoxy - α - thiolincosaminide (IX) 50 ccs. methanol, and 5 ccs. glacial acetic acid was heated under gentle reflux in an oil bath at 130° C. for six hours. The solvent was removed from the colorless solution at 40° C./7 mm. on a rotary evaporator yielding a pale yellow syrup which crystallized. The crystals were taken up in methylene chloride solution, washed with saturated aqueous sodium bicarbonate, then with water, and then dried over anhydrous sodium sulfate. Removal of the solvent as above gave methyl N-acetyl-2,3,4-tri-O-acetyl-7(S)-methoxy-7-deoxy-α - thiolincosaminide (X) as colorless crystals (53.1 gms.). Crystallization from ethyl acetate-Skellysolve B gave fine colorless needles having the following properties: M.P. 235–236° C. $[\alpha]_D$ +205° (c., 0.9952, CHCl$_3$).

Analysis.—Calcd. for $C_{18}H_{29}O_9NS$ (percent): C, 49.64; H, 6.71; N, 3.22; S, 7.36; OMe, 7.13. Found (percent): C, 49.77; H, 6.92; N, 3.65; S, 7.90; OMe, 7.38. Mol. wt. calcd.: 435.49. Found (Mass spec.): 435.

On hydrazinoylsis by the procedure of Part B–1 there is obtained methyl 7-deoxy-7(S)-methoxy-α-thiolincosaminide (VII).

EXAMPLE 3—Modification of Example 1

Part A–3: Methyl N - acetyl-2,3,4-tri-O-acetyl-7-deoxy-7(S) - methoxy - α - thiolincosaminide (X) and methyl N - acetyl - 2,3 - di - O - acetyl - 7 - deoxy-7(S)-methoxy - α - thiolincosaminide (XI)

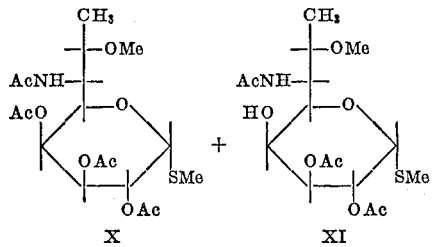

To 26.61 gms. of methyl N-acetyl - 7 - deoxy-7(S)-methoxy-α-thiolincosaminide (VI) in 100 ccs. of pyridine there was added 50 ccs. of acetic anhydride with stirring and the reaction mixture allowed to stand overnight at room temperature. The volatile materials were then removed by distillation on a rotary evaporator at 40° C./7 mm. and finally under high vacuum. The residue was dissolved in chloroform and washed with saturated aqueous sodium bicarbonate. The aqueous layer was washed with chloroform and the combined chloroform extracts stirred with aqueous cadmium chloride to remove the pyridine.

The precipitate was filtered off and washed well with chloroform and the chloroform layer separated, washed twice with water and dried over anhydrous sodium sulfate. On removal of the solvent on a rotary evaporator at 40° C./7 mm. a pale yellow syrup which crystallized on standing was obtained. On recrystallization from ethyl acetate-Skellysolve B, the product was obtained as small colorless, flattened needles, and had the following characteristics: M.P. 245–247° C. $[\alpha]_D$ +202° (c., 0.7142, CHCl$_3$).

Analysis.—Calcd. for $C_{18}H_{29}O_9NS$ (percent): C, 49.64; H, 6.71; N, 3.22; S, 7.36; OMe, 7.13. Found (percent): C, 49.24; H, 6.75; N, 3.34; S, 7.52; OMe, 7.17. Mol. wt. calcd.: 435.49. Found (Mass spec.): 435.

The above material by Craig countercurrent distribution using as a solvent system 1 EtOH:1 H$_2$O:1 EtOAc:1 cyclohexane was shown to contain 70% of methyl N-acetyl - 2,3,4 - tri - O - acetyl - 7 - deoxy-7(S)-methoxy-α - thiolincosaminide (X) and 30% of methyl N-acetyl-2,3 - di - O - acetyl - 7 - deoxy-7(S)-methoxy-α-thiolincosaminide (XI). After 500 transfers, fractions from tubes 225–310 were pooled (K value 1.14) and evaporated to dryness and on recrystallization from ethyl acetate-Skellysolve B gave methyl N-acetyl-2,3,4-tri-O-acetyl-7-deoxy-7(S)-methoxy - α - thiolincosaminide (X) as fine colorless needles, identical with the product of Part B–2.

Fractions from tubes 115–220 (K value 0.59) were pooled and evaporated to dryness and on recrystallization from ethyl acetate-Skellysolve B gave methyl N-acetyl-2,3 - di - O - acetyl - 7 - deoxy-7(S)-methoxy-α-thiolincosaminide (XI) as colorless chunky needles having the following characteristics: M.P. 189–190° C. $[\alpha]_D$ +275° (c., 1.0188, CHCl$_3$).

Analysis.—Calcd. for $C_{16}H_{27}O_8NS$ (percent): C, 48.84; H, 6.92; N, 3.56; S, 8.15; OMe, 7.89. Found (percent): C, 48.71; H, 7.11; N, 3.93; S, 7.96; OMe, 7.98. Mol. wt. calcd.: 393.46. Found (Mass spec.): 393.

Part B–3: Acetylation of methyl N-acetyl 2,3-di-O-acetyl-7-deoxy-7(S)-methoxy-α-thiolincosaminide (XI)

To a solution of 200 mg. of methyl N-acetyl-2,3-di-O-acetyl - 7 - deoxy - 7(S) - methoxy - α - thiolincosaminide (XI) in 20 ccs. of pyridine was added 10 ccs. of acetic anhydride with stirring and the reaction mixture left at room temperature overnight. The solvent was removed from the colorless reaction solution on a rotating evaporator at 40° C./7 mm. finally at 40° C./high vacuum. The syrupy residue was dissolved in chloroform, washed with dilute aqueous HCl (½ normal), twice with water, with saturated sodium bicarbonate solution and twice with water, and dried over anhydrous sodium sulfate. The solvent was then removed on a rotating evaporator at 40° C./7 mm. yielding methyl N-acetyl-2,3,4-tri-O-acetyl-7-deoxy-7(S)-methoxy-α-thiolincosaminide (X) as a colorless syrup which crystallized on standing.

On hydrozinolysis of the products of Part A–3 and B–3, there is obtained methyl 7 - deoxy - 7(S)-methoxy-α-thiolincosaminide (VII).

EXAMPLE 4—Alternative for Example 1

Part A–4: Methyl N-acetyl 6,7-aziridino-6-deamino-7-deoxy-α-thiolincosaminide (XII)

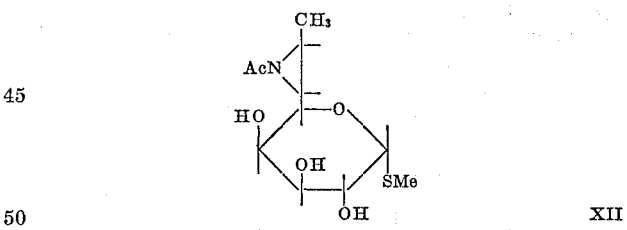

To a suspension of 2.3 gms. of methyl 6,7-aziridino-6 - deamino - 7 - deoxy - α - thiolincosaminide (V) in 25 ccs. isopropyl alcohol, there was added with stirring 2.04 gms. acetic anhydride. Most of the solid appeared to go into solution to be replaced by new solid. The reaction mixture was stirred overnight at room temperature, then filtered and the residue washed with isopropyl alcohol and dried in a vacuum oven at 60° C./15 mm. There was obtained 2.28 gms. of methyl N-acetyl-6,7-aziridino-6-deamino-7-deoxy-α-thiolincosaminide as colorless platelets having the following properties: M.P. 145° C. $[\alpha]_D$ +253° (c., 0.7916, H$_2$O).

Analysis.—Calcd. for $C_{11}H_{19}O_5NS$ (percent): C, 47.63; H, 6.91; N, 5.05; S, 11.56. Found (percent): C, 47.57; H, 6.71; N, 5.23; S, 11.29. Mol. wt. calcd.: 277.34. Found (Mass spec.): 277.

Part B–4: Methyl N-acetyl-7-deoxy-7(S)-methoxy-α-thiolincosaminide (VI)

On treating methyl N-acetyl 6,7-azirindino-6-deamino-7-deoxy - α - thiolincosaminide (XII) with methanol and acetic acid under reflux, there is obtained methyl N-acetyl-7 - deoxy - 7(S) - methoxy - α - thiolincosaminide (VI) identical with the product of Part A–1.

EXAMPLE 5.—7-Deoxy-7(S)-ethoxylincomycin Hydrochloride

Part A–5: Methyl N-acetyl-7-deoxy-7(S)-ethoxy-α-thiolincosaminide (XIII)

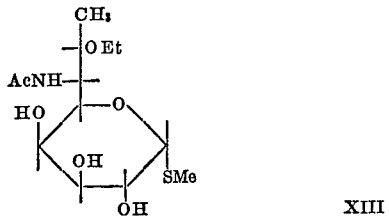
XIII

On treating the methyl N-acetyl-6,7-aziridino-6 - deamino-7-deoxy-α-thiolincosaminide (XII) with ethanol and acetic acid under gentle reflux, there is obtained methyl N - acetyl-7-deoxy-7(S)-ethoxy-1-thio-α-lincosaminide (XIII) as a syrup having the molecular weight by mass spec. of 323 compared with the calculated molecular weight of 323.41.

Part B–5: Methyl N-acetyl-2,3,4-tri-O-acetyl-7-deoxy-7(S)-ethoxy-α-thiolincosaminide (XIV) and methyl N-acetyl-7-deoxy-7(S)-ethoxy-2,3,di-O-acetyl-α-thiolincosaminide (XV)

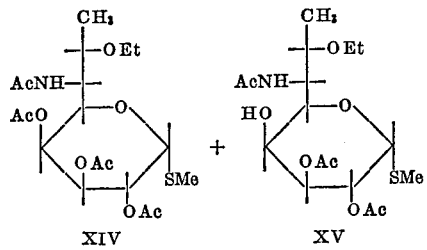
XIV     XV

On treating the methyl N-acetyl-7-deoxy-7(S)-ethoxy-α-thiolincosaminide (XIII) with acetic anhydride and pyridine by the process of Part A–3, there is obtained methyl N-acetyl-2,3,4-tri-O-acetyl-7-deoxy-7(S)-O-ethyl-α - thiolincosaminide (XIV) together with a minor amount of N-acetyl-2,3-di-O-acetyl-7 - deoxy - 7(S) - ethoxy - α-thiolincosaminide (XV). The products (isolated on a Craig in 500 transfers using ethanol:water:ethyl acetate:cyclohexane (1:1:1:1) as the solvent system) are characterized as follows:

Mixture: M.P. 197–199° C. [α]$_D$+247° (c., 0.665, CHCl$_3$).

Analysis.—Calcd. for C$_{19}$H$_{31}$O$_9$NS (percent): C, 50.76; H, 6.95; N, 3.12; S, 7.13; OEt, 10.02. Found (percent): C, 50.42; H, 7.07; N, 3.18; S, 7.37; OEt, 11.85.

Pure XIV (K=1.59): M.P. 254–255° C. [α]$_D$+199° (c., 0.8638, CHCl$_3$).

Analysis.—Calcd. for C$_9$H$_{31}$O$_9$NS (percent): C, 50.76; H, 6.95; N, 3.12; S, 7.13; OEt, 10.02. Found (percent): C, 50.75; H, 7.06; N, 3.37; S, 7.31; OEt, 10.25. Mol. wt. Calcd.: 449.52. Found (Mass spec.): 449.

Pure XV (K=0.87): M.P. 215.5–216.5° C. [α]$_D$+261° (c., 1.0448, CHCl$_3$).

Analysis.—Calcd. for C$_{17}$H$_{29}$O$_8$NS (percent): C, 50.11; H, 7.17; N, 3.44; S, 7.87. Found (percent): C, 50.17; H, 7.30; N, 3.50; S, 7.62. Mol. wt. Calcd.: 407.48. Found (Mass spec.): 407.

Part C–5: Methyl 7-deoxy-7(S)-ethoxy-α-thiolincosaminide (XVI)

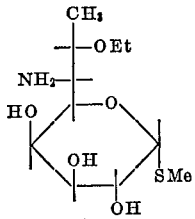
XVI

On subjecting the products of Part B–5, that is, the mixture, the pure XIV or the pure XV, to hydrazinolysis, there is obtained methyl 7-deoxy-7(S)-ethoxy-α-thiolincosaminide (XVI) having the following characteristics:

M.P. 194–196° C. [α]$_D$+252° (c., 0.7438, H$_2$O).

Analysis.—Calcd. for C$_{11}$H$_{23}$O$_5$NS (percent): C, 46.95; H, 8.24; N, 4.98; S, 11.40. Found (percent): C, 46.66; H, 8.09; N, 5.26; S, 11.33. Mol. wt. Calcd.: 281.37. Found (Mass spec.): 281.

Part D–5: 7-deoxy-7(S)-ethoxylincomycin hydrochloride (XVII)

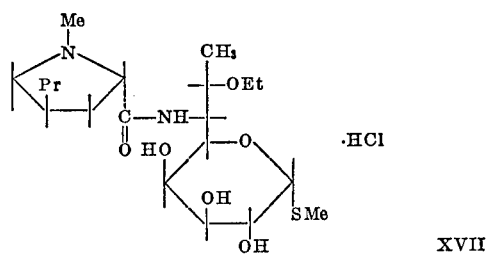
XVII

Following the procedure of Part C–1, methyl 7-deoxy-7(S)-ethoxy-α-thiolincosaminide (XVI) is converted to 7-deoxy-7(S)-ethoxylincomycin hydrochloride having the following characteristics:

M.P. colorless amorphous solid [α]$_D$+109° (c., 0.9824, H$_2$O).

Analysis.—Calcd. for C$_{29}$H$_{38}$O$_6$N$_2$S·HCl (percent): C, 50.09; H, 8.35; N, 5.95; Cl, 7.53; S, 6.81; OEt, 9.57. Found (Corrected for 5.07% water) (percent): C, 50.54; H, 8.19; N, 5.63; Cl, 7.61; S, 6.95; OEt, 10.16.

EXAMPLE 6

Part A–6: Methyl N-acetyl-7-deoxy-7(S)-propoxy-α-thiolincosaminide (XVIII), methyl N-acetyl-2,3,4-tri-O-acetyl-7-deoxy-7(S) - propoxy - α - thiolincosaminide (XIX), and methyl N-acetyl-7-deoxy-7(S)-propoxy-2,3-di-O-acetyl-α-thiolincosaminide (XX)

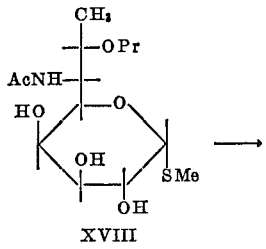
XVIII

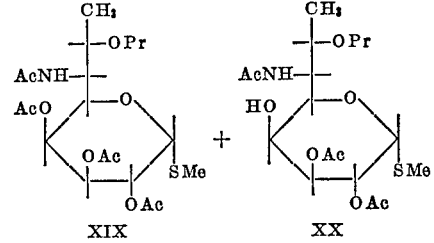
XIX     XX

On treating the methyl N-acetyl6,7-aziridino-6-deamino-7-deoxy-α-thiolincosaminide (XII) with propanol and acetic acid under gentle reflux, there is obtained methyl N - acetyl - 7 - deoxy - 7(S)-propoxy-α-thiolincosaminide (XVII) from which on acetylation with acetic anhydride in pyridine by the procedure of Part B–5, there is obtained methyl N-acetyl-2,3,4-tri-O-acetyl-7(S)-propoxy-7-deoxy-α-thiolincosaminide (XIX) containing a minor amount of methyl N - acetyl - 2,3 - di-O-acetyl-7(S)-propoxy-7-deoxy - α - thiolincosaminide (XX) having the following characteristics:

Mixture: M.P. 240–242° C. [α]$_D$ +207° (c., 0.9054, CHCl$_3$).

Analysis.—Calcd. for C$_{20}$H$_{33}$O$_9$NS (percent): C, 51.81; H, 7.17; N, 3.03; S, 6.92. Found (percent): C, 51.41; H, 7.33; N, 3.16; S, 6.92. Mol. Wt. Calcd.: 463.60. Found (Mass spec.): 463.

Pure XIX: M.P. 241.5–242.5° C. [α]$_D$ +193° (c., 0.9254 CHCl$_3$).

Analysis.—Calcd. for C$_{20}$H$_{33}$O$_9$NS (percent): C, 51.81; H, 7.17; N, 3.03; S, 6.92. Found (percent): C, 51.77; H, 7.02; N, 3.37; S, 6.84. Mol. Wt. Calcd.: 463.60. Found (Mass spec.): 463.

Part B-6: Methyl 7-deoxy-7(S)-propoxy-α-thiolincosaminide

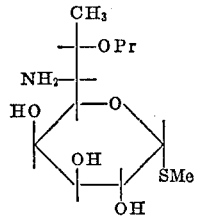

XXI

On hydrazinolysis of the above products (Part A-6) there is obtained methyl 7-deoxy-7(S)-propoxy-α-thiolincosaminide (XXI).

Part C-6: 7-deoxy-7(S)-propoxylincomycin hydrochloride (XXII)

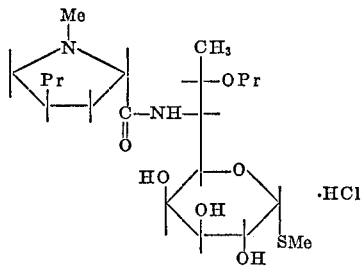

XXII

On acylation with trans-1-methyl-4-propyl-L-2-pyrroline-carboxylic acid by the procedure of Part C-1, there is obtained 7-deoxy-7(S)-propoxylincomycin hydrochloride (XXII).

EXAMPLE 7

Part A-7: Methyl N-acetyl-2,3,4-tri-O-acetyl-7-deoxy-7(S)-isopropoxy-α-thiolincosaminide (XXIII)

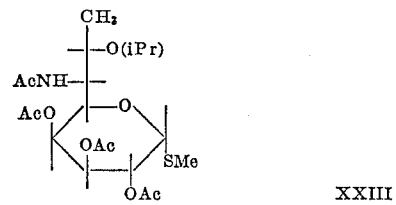

XXIII

Following the procedure of Part B-2 but substituting the methanol by isopropyl alcohol, there is obtained methyl N-acetyl-2,3,4-tri-O-acetyl-7-deoxy-7(S)-isopropoxy-α-thiolincosaminide (XXIII) having the following characteristics: M.P. 253–254° C. [α]$_D$ +192° (c., 0.5352, CHCl$_3$).

Analysis.—Calcd. for C$_{20}$H$_{33}$O$_9$NS (percent): C, 51.81; H, 7.17; N, 3.03; S, 6.92. Found (percent): C, 51.96; H, 7.07; N, 3.19; S, 6.61. Mol. Wt. Calcd.: 463.6. Found (Mass spec.): 463.

Part B-7: Methyl 7-deoxy-7(S)-isopropoxy-α-thiolincosaminide (XXIV)

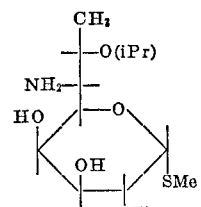

XXIV

On hydrazinolysis of compound XXIII (Part A-7), there is obtained methyl 7-deoxy-7(S)-isopropoxy-α-thiolinocosaminide having the following characteristics: M.P. 212–213° C. [α]$_D$ +225° (c., 0.376, H$_2$O).

Analysis.—Calcd. for C$_{12}$H$_{35}$O$_5$NS (percent): C, 48.79; H, 8.53; N, 4.74; S, 10.86. Found (percent): C, 48.52; H, 8.55; N, 5.26; S, 10.84. Mol. Wt. Calcd.: 295.40. Found (Mass spec.): 295.

Part C-7: 7-deoxy-7(S)-isopropoxylincomycin hydrochloride (XXV)

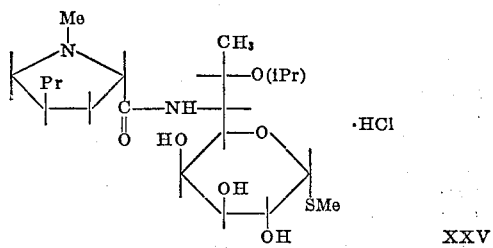

XXV

Following the procedure of Part C-1, compound XXV (Part C-7) is converted to 7-deoxy-7(S)-isopropoxylincomycin hydrochloride having the following characteristics: M.P. amorphous. [α]$_D$ +85° (c., 0.898, H$_2$O).

Analysis.—Calcd. for C$_{21}$H$_{40}$O$_6$N$_2$S·HCl (percent): C, 51.99; H, 8.52; N, 5.78; S, 6.61; Cl, 7.31. Found (Corrected for 4.36% H$_2$O) (percent): C, 51.72; H, 8.33; N, 5.59; S, 6.35; Cl, 7.29. Mol. Wt. Calcd. (free base): 448.62. Found: 448.

Activity: about the same as lincomycin.

EXAMPLE 8

Part A-8: Methyl N-acetyl-2,3,4-tri-O-acetyl-7-deoxy-(S)-cyclohexyloxy-α-thiolincosaminide (XXVI)

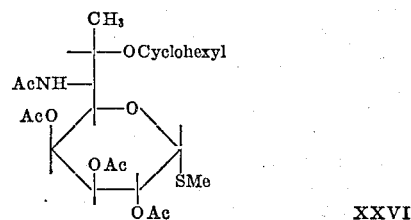

XXVI

Following the procedure of Part B-2 but substituting the methanol by cyclohexanol, there is obtained methyl N-acetyl-2,3,4-tri-O-acetyl-7-deoxy-7(S)-cyclohexyloxy-α-thiolincosaminide (XXVI) having the following characteristics: M.P. 266–268° C. [α]$_D$ +163° (c., 1.0548, CHCl$_3$).

Analysis.—Calcd. for C$_{23}$H$_{37}$O$_9$NS (percent): C, 54.85; H, 7.41; N, 2.78; S, 6.37. Found (percent): C, 54.93; H, 7.53; N, 2.87; S, 6.65. Mol. Wt. Calcd.: 503.61. Found (Mass spec.): 503

Part B-8: Methyl 7(S)-cyclohexyloxy-7-deoxy-α-thionlincosaminide (XXVII)

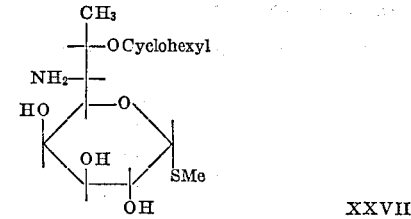

XXVII

On hydrazinolysis of compound XXVI (Part A-8), there is obtained methyl 7(S)-cyclohexyloxy-7-deoxy-α-thiolincosaminide (XXVII)

Part C-8: 7(S)-cyclohexyl-7-deoxylincomycin hydrochloride (XXVIII)

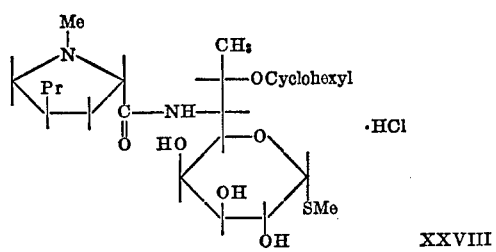

XXVIII

Following the procedure of Part C-1, methyl 7(S)-cyclohexyloxy - 7 - deoxy - α - thiolincosaminide (XXVII) is converted to 7(S) - cyclohexyloxy - 7 - deoxylincomycin hydrochloride (XXVIII).

EXAMPLE 9

Part A-9: Methyl N - acetyl - 7 - deoxy - 7(S) - 2' - hydroxyethoxy - α - thiolincosaminide (XXIX) and methyl N - acetyl - 2,3,4 - tri - O - acetyl - 7(S) - 2' - acetoxyethoxy-7-deoxy-α-thiolincosaminide (XXX)

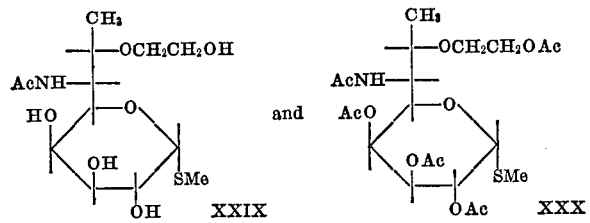

XXIX            XXX

Following the procedure of Part A-1 but substituting the methanol by 2 - hydroxyethanol, there is obtained methyl N - acetyl - 7 - deoxy - 7(S) - 2' - hydroxyethoxy- α - thiolincosaminide (XXIX) which when acylated by the procedure of Part A-3 but with heating on a steam bath to produce the fully acylated product gives methyl N - acetyl - 2,3,4 - tri - O - acetyl - 7(S) - 2' - acetoxyethoxy - 7 - deoxy - α - thiolincosaminide having the following characteristics: M.P. 223–225° C. $[\alpha]_D$ +172° (c. 1.0098, CHCl$_3$).

*Analysis.*—Calcd. for $C_{21}H_{33}O_{11}NS$ (percent): C, 49.69; H, 6.55; N, 2.76; S, 6.32. Found (percent): C, 49.56; H, 6.63; N, 2.90; S, 6.63. Mol. Wt. Calcd.: 507.55. Found: 507.

Part B-9: Methyl 7-deoxy-7(S)-2'-hydroxyethoxy-α-thiolincosaminide (XXXI)

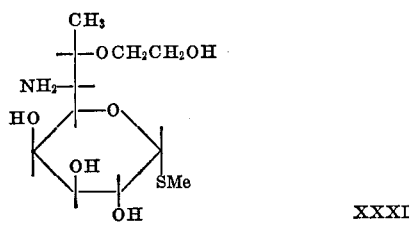

XXXI

On hydrazinolysis of methyl N - acetyl - 2,3,4 - tri- O - acetyl - 7 - deoxy - 7(S) - 2' - acetoxyethoxy - α-thiolincosaminide (XXXI), there is obtained methyl 7-deoxy - 7(S) - 2' - hydroxyethoxy - α - thiolincosaminide having the following characteristics: M.P. 178.5–179.5 C. $[\alpha]_D$ +243° (c., 0.6602, H$_2$O).

*Analysis.*—Calcd. for $C_{11}H_{23}O_6NS$ (percent): C, 44.43; H, 7.80; N, 4.71; S, 10.78. Found (percent): C, 44.40; H, 7.99; N, 4.60; S, 10.51. Mol. Wt Calcd.: 297.37. Found (Mass spec.): 297.

Part C-9: 7-Deoxy-7(S)-2'-hydroxyethoxylincomycin hyrochloride

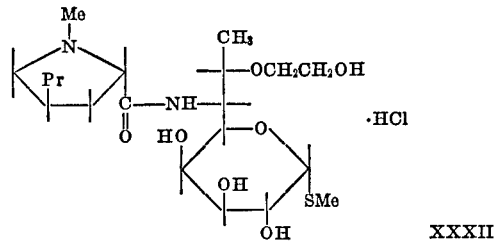

XXXII

Following the procedure of Part C-1, methyl 7-deoxy-7(S) - 2' - hydroxyethoxy - α - thiolincosaminide (XXXI) is converted to 7 - deoxy - 7(S) - 2' - hydroxyethoxylincomycin hydrochloride having the following characteristics: M.P. amorphous $[\alpha]_D$ 107° (c. 1.102, H$_2$O).

*Analysis.*—Calcd. for $C_{20}H_{38}O_7N_2S \cdot HCl$ (percent): C, 49.32; H, 8.07; N, 5.75; S, 6.58; Cl, 7.28. Found (Corrected for 2.11% H$_2$O) (percent): C, 49.61; H, 7.85; N, 5.54; S, 6.46; Cl, 7.76. Mol. Wt. Calcd. (free base): 450.59. Found (Mass spec.): 450. Activity: about ⅓ lincomycin.

EXAMPLE 10

Part A-10: Methyl N - acetyl - 7 - deoxy - 7(S) - 2'-methoxyethoxy - α - thiolincosaminide (XXXIII) and N - acetyl - 2,3,4 - tri - O - acetyl - 7 - deoxy - 7(S)-2'-methoxyethoxy-α-thiolincosaminide (XXXIV)

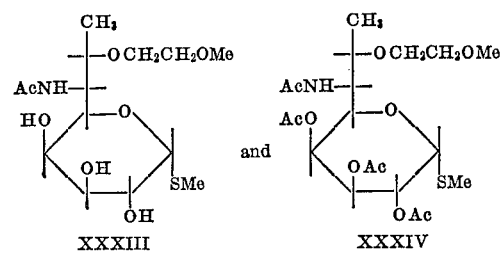

XXXIII            XXXIV

Following the procedure of Part A-1 but substituting the methanol by 2-methoxyethanol, there is obtained methyl N-acetyl-7-deoxy-7(S)-2'-methoxyethoxy-α-thiolincosaminide (XXXII) which on acetylation by the procedure of Part A-3 but with heating on a steam bath to produce the fully acetylated product yields methyl N-acetyl-2,3,4-tris - O-acetyl-7-deoxy - 7(S)-2'-methoxyethoxy-α-thiolincosaminide (XXXIV) which is characterized as follows M.P. 222–223° C. $[\alpha]_D$+177° (c. 1.0788, CHCl$_3$).

*Analysis.*—Calcd. for $C_{20}H_{33}O_{10}NS$ (percent): C, 50.09; H, 6.94; N, 2.92; S, 6.69; OMe, 6.47. Found (percent): C, 50.13; H, 7.00; N, 2.77; S, 6.33; OMe, 7.28. Mol. Wt. Calcd.: 497.54. Found (Mass spec.): 479.

Part B-10: Methyl 7-deoxy-7(S)-2'-methoxyethyl-α-thiolincosaminide (XXXV)

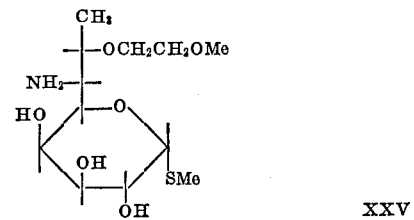

XXV

On hydrazinolysis of methyl N-acetyl-2,3,4-tri-O-acetyl-7-deoxy-7(S)-2' - methoxyethoxy - α-thiolincosaminide (XXXIV), there is obtained methyl 7-deoxy-7(S)-2'-methoxyethoxy - α-thiolincosaminide (XXXV) having the following characteristics: M.P. 178–9° C. $[\alpha]_D$+231° (c., 0.8272, H$_2$O).

*Analysis.*—Calcd. for $C_{12}H_{25}O_6NS$ (percent): C, 46.28; H, 8.09; N, 4.50; S, 10.30. Found (percent): C, 46.57; H, 8.32; N, 5.01; S, 10.70. Mol. Wt. Calcd.: 311.40. Found (Mass spec.): 311.

Part C–10: 7-deoxy-7(S)-2′-methoxyethoxy-lincomycin hydrochloride

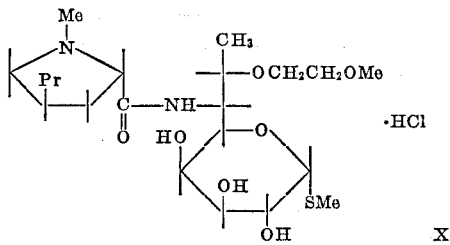

Following the procedure of Part C–1, methyl 7-deoxy-7(S)-2′-methoxyethoxy-α-thiolincosaminide (XXXV) is converted to 7-deoxy-7(S)-2′-methoxyethoxylincomycin hydrochloride having the following characteristics: M.P. amorphous [α]$_D$+91° (c., 0.5746, H$_2$O).

Analysis.—Calcd. for C$_{21}$H$_{40}$O$_7$N$_2$S·HCl (percent): C, 50.33; H, 8.25; N, 5.59; S, 6.40; Cl, 7.08. Found (Corrected for 4.17 H$_2$O) (percent): C, 50.47; H, 8.60; N, 5.26; S, 5.86; Cl, 7.50.

Mol. Wt. Calcd. (free base): 464.62. Found (Mass spec.): 464. Activity: About ⅓ lincomycin.

EXAMPLE 11

Methyl 7-deoxy-7(S) - hydroxy - α - thiolincosaminide (XXXVII) (methyl 6-amino-6,8-dideoxy-L-threo-α-D-galacto-octopyranoside)

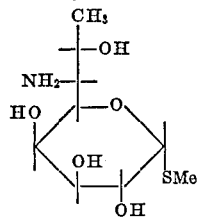

XXXVII

Part A–11: Methyl N-acetyl-7-deoxy-7(S)-hydroxy-α-thiolincosaminide (XXXVIII) (methyl 6-acetamido-6,8-dideoxy-L-threo-α-D-galacto-octopyranoside)

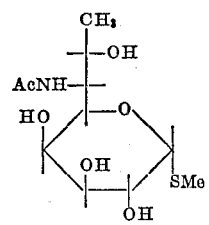

XXXVIII

To a solution of 2.35 gms. of methyl 6,7-aziridino-6-deamino-7-deoxy-α-thiolincosaminide (V) in 25 ccs. of water was added 2.04 gms. of acetic anhydride and the solution left at room temperature overnight. The solution was then taken to dryness on a rotary evaporator at 40° C./7 mm. to give a colorless syrup which was chromatographed on 750 gms. of silica gel in a 4.8 x 98 cm. column using 1 MeOH:7 CHCl$_3$ as the solvent system. After a forerun of 550 ml., 50 ml. fractions were collected. Fractions 90 through 160 were pooled and taken to dryness to give 2.3 gms. of methyl N-acetyl 7-deoxy-7(S)-hydroxy-α-thiolincosaminide as a colorless solid which crystallized from methanol as colorless rods having the following characteristics: M.P. 218–219° C. [α]$_D$+260° (c., 1.0296, H$_2$O).

Analysis.—Calcd. for C$_{11}$H$_{21}$O$_6$NS (percent): C, 44.73; H, 7.17; N, 4.74; S, 10.86. Found (percent): C, 44.89; H, 7.02; N, 5.16; S, 10.64. Mol. Wt. Calcd.: 295.36. Found (Mass spec.): 295.

Part B–11: Deacetylation

The crystallized material from Part A–11 was combined with the mother liquors and taken to dryness on a rotary evaporator at 40° C./7 mm. to give 2.01 gms. solid which was heated overnight under gentle reflux with 40 ccs. of hydrazine hydrate with stirring. The solvent was removed from the colorless solution on a rotary evaporator at 7 mm. pressure in an oil bath at 120° C. The resulting colorless crystalline residue on recrystallization from methanol gave methyl 7-deoxy-7(S)-hydroxy-α-thiolincosaminide (XXXVII) as colorless platelets having the following characteristics: M.P. 211–212° C. [α]$_D$+280° (c., 0.7728, H$_2$O).

Analysis.—Calcd. for C$_9$H$_{19}$O$_5$NS (percent): C, 42.67; H, 7.56; N, 5.53; S, 12.66. Found (percent): C, 42.81; H, 7.69; N, 5.85; S, 12.73. Mol. Wt. Calcd.: 253.32. Found (Mass spec.): 253.

EXAMPLE 12

Methyl N - acetyl-2,3,4-tri-O-acetyl-7(S)-ethoxy-7-deoxy-α-thiolincosaminide (XIV) and methyl N-acetyl-2,3,4-tri-O-acetyl-7(S) - acetoxy-7-deoxy-α-thiolincosaminide (XXXIX)

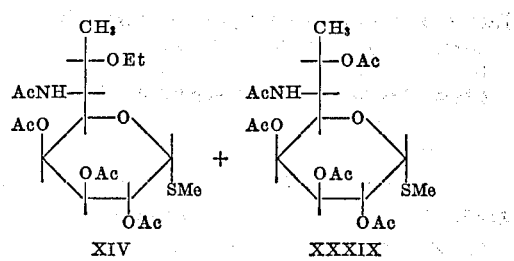

XIV XXXIX

Following the procedure of Part B–2 but substituting the methanol by ethanol there is obtained methyl N-acetyl-2,3,4-tri-O-acetyl-7(S)-ethoxy - 7 - deoxy-α-thiolincosaminide (XIV) identical with the product of Part B–5 and a minor amount of N-acetyl 2,3,4-tri-O-acetyl-7(S)-acetoxy - 7 - deoxy-α-thiolincosaminide (XXXIX) which can be separated by Craig countercurrent distribution using 1 EtOH:1 H$_2$O:1 EtOAc:1.5 cyclohexane as the solvent system in 500 transfers. The minor component (XXXIX) was obtained from tubes numbers 140–200 (K=0.52), and the major component (XIV), from tubes numbers 260–330 (K=1.43). The minor component (XXXIX) crystallized from ethyl acetate as colorless needles having the following characteristics: M.P. 312–313° C. [α]$_D$+182° (c., 0.5898, CHCl$_3$).

Analysis. — Calcd. for C$_{19}$H$_{29}$O$_{10}$NS (percent): C, 49.22; H, 6.31; N, 3.02; S, 6.92. Found (percent): C, 49.17; H, 6.51; N, 3.08; S, 6.81. Mol. Wt. Calcd.: 463.50. Found (Mass spec.): 463.

On subjecting the minor component to hydrazinolysis there is obtained methyl 7-deoxy-7(S)-hydroxy-α-thiolincosaminide (XXXVIII) identical with the product of Part B–11.

I claim:
1. A process for making compounds of the formula

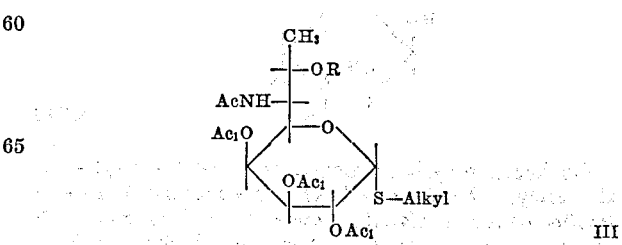

III where Alkyl is alkyl of not more than 4 carbon atoms, R is hydrogen or a hydrocarbon radical of not more than 12 carbon atoms or a hydroxy-substituted, alkoxy-substituted, or halo-substituted hydrocarbon radical of not more than 12 carbon atoms, AC and AC$_1$ are hydrogen or acetyl which comprises opening the aziridino ring of a compound of the formula

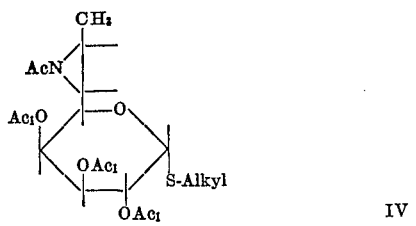

where Ac is acetyl and Alkyl and $Ac_1$ are as given above by solvolysis with a compound of the Formula ROH wherein R is as given above and subjecting the product to hydrazinolysis when it is desired that Ac and $Ac_1$ be hydrogen.

2. The process of claim 1 in which the solvolysis is effected in the presence of acetic acid.
3. The process of claim 2 in which $Ac_1$ is hydrogen.
4. The process of claim 2 in which $Ac_1$ is acetyl.
5. The process of claim 3 in which ROH is lower alkanol.
6. The process of claim 4 in which ROH is lower alkanol.
7. The process of claim 2 in which a starting compound of the formula

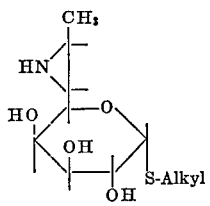

is N-acylated with acetic acid anhydride whereby acetic acid is freed to catalyze the solvolysis to form a compound of the formula

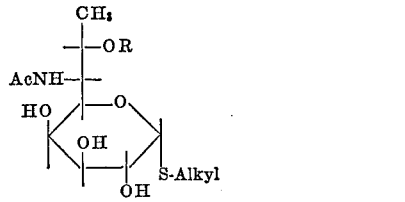

wherein R and Alkyl are as given in claim 1 and Ac is acetyl.

8. The process of claim 7 in which R is hydrogen.
9. The process of claim 7 in which R is lower alkyl.
10. The process of claim 2 in which the starting compound has the formula

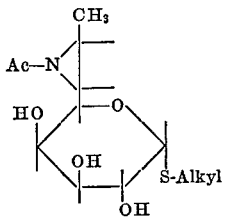

whereby the product has the formula

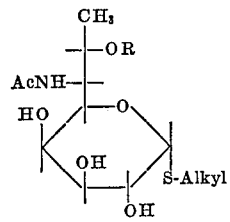

wherein Ac is acetyl and R is lower alkyl and Alkyl is as given in claim 1.

11. The process of claim 2 wherein the starting compound has the formula

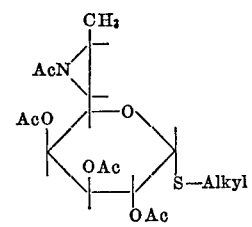

whereby the product has the formula

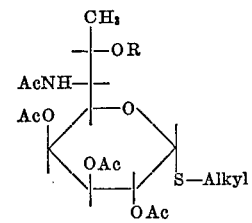

wherein Ac is acetyl, and R is lower alkyl and Alkyl is as given in claim 1.

12. The process according to claim 2 in which a starting compound where Ac and $Ac_1$ are hydrogen is peracetylated prior to the opening of the aziridino ring whereby a peracetylated product essentially free of partially acetylated product is obtained.

13. The process according to claim 2 in which the product is peracetylated after the aziridine ring is opened whereby a peracetylated product is obtained concomitantly with a minor amount of a compound of the formula

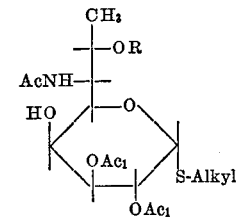

wherein Ac and $Ac_1$ are acetyl and R and Alkyl are as given in claim 1.

14. The process according to claim 2 wherein the starting compound has the formula

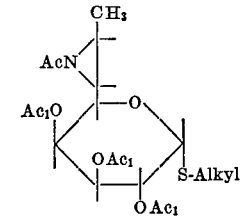

and the solvolysis is effected with ethanol and higher alcohols whereby the product is obtained concomitantly with a minor amount of a compound of the formula

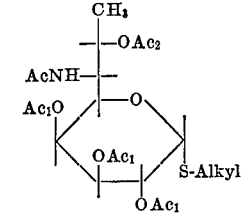

wherein Ac, $Ac_1$, and $Ac_2$ are acetyl.

15. A compound of the formula

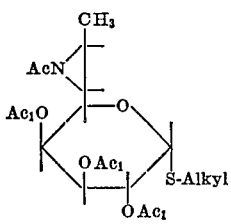

wherein Ac is acetyl, $Ac_1$ is hydrogen or acetyl, and Alkyl is alkyl of not more than 4 carbon atoms.

16. The compound of claim 15 in which $Ac_1$ is acetyl.

17. The compound of claim 15 in which $Ac_1$ is hydrogen.

18. A compound of the formula

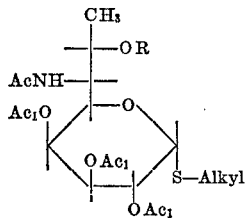

wherein Ac is hydrogen or acetyl and $Ac_1$ is hydrogen or acetyl, R is hydrocarbon containing not more than 12 carbon atoms or hydroxy-substituted, alkoxy-substituted, or halo-substituted hydrocarbon containing not more than 12 carbon atoms, and Alkyl is alkyl of not more than 4 carbon atoms.

19. The compound of claim 25 in which Ac is acetyl and $Ac_1$ is hydrogen.

20. The compound of claim 18 in which Ac and $Ac_1$ are acetyl.

21. The compound of claim 18 in which Ac and $Ac_1$ are hydrogen.

22. The compound of claim 19 in which R is methyl, or acetoxyethyl.

23. The compound of claim 19 in which R is lower alkyl.

24. The compound of claim 21 in which R is methyl.

25. A compound of the formula

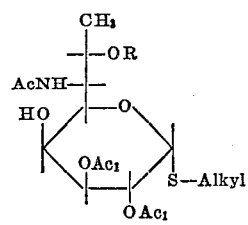

wherein Ac and $Ac_1$ are acetyl and R and Alkyl is alkyl of not more than 4 carbon atoms.

26. A compound of the formula

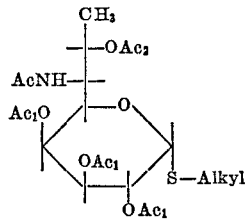

in which Ac, $Ac_1$ and $Ac_2$ are acetyl and Alkyl is alkyl of not more than 4 carbon atoms.

27. Methyl 7-O-methyl-6,8-dideoxy-6-(trans-1-methyl-4-propyl-L-2-pyrrolindinecarboxamido-1-thio-L-threo-α-D-galacto-octopyranoside) and the pharmacologically acid addition salts thereof.

28. The hydrochloride salt of the compound of claim 27.

References Cited
UNITED STATES PATENTS

| | | | |
|---|---|---|---|
| 3,300,475 | 1/1967 | Bannister | 260—210 R |
| 3,326,891 | 6/1967 | Hoeksema et al. | 260—210 R |
| 3,366,624 | 1/1968 | Argoudelis et al. | 260—210 R |
| 3,544,551 | 12/1970 | Kagan et al. | 260—210 R |

LEWIS GOTTS, Primary Examiner

J. R. BROWN, Assistant Examiner

U.S. Cl. X.R.

260—2.5; 999